United States Patent
Rieman et al.

(10) Patent No.: US 7,801,928 B2
(45) Date of Patent: Sep. 21, 2010

(54) METHOD, COMPUTER-READABLE MEDIUM, APPARATUS, USER INTERFACE, AND SYSTEM FOR PROVISION OF A DICTIONARY

(75) Inventors: John Rieman, Helsinki (FI); Minna Hekanaho, Oulu (FI); Minna Koutonen, Oulu (FI); Tero Rantonen, Oulu (FI); John Hard, Malmo (SE)

(73) Assignee: Nokia Corporation, Espoo, FL (US)

( * ) Notice: Subject to any disclaimer, the term of this patent is extended or adjusted under 35 U.S.C. 154(b) by 307 days.

(21) Appl. No.: 11/693,108

(22) Filed: Mar. 29, 2007

(65) Prior Publication Data

US 2008/0243875 A1    Oct. 2, 2008

(51) Int. Cl.
*G06F 17/30* (2006.01)

(52) U.S. Cl. .............................. 707/804; 707/E17.128; 704/10; 715/259

(58) Field of Classification Search .................. 707/10, 707/100, 102, 1, 2, 736, 802, 804, E17.128, 707/999.004, 999.1, 999.01; 704/10; 715/259
See application file for complete search history.

(56) References Cited

U.S. PATENT DOCUMENTS

| | | | |
|---|---|---|---|
| 7,313,516 B2 * | 12/2007 | Oshima | 704/10 |
| 2006/0009150 A1 * | 1/2006 | Leung et al. | 455/3.01 |
| 2006/0248113 A1 * | 11/2006 | Leffert et al. | 707/103 R |

* cited by examiner

*Primary Examiner*—Cheryl Lewis
(74) *Attorney, Agent, or Firm*—Perman & Green LLP

(57) ABSTRACT

A method is disclosed, including determining an application to be executed; determining a dictionary associated to the determined application; and enabling the associated dictionary. Corresponding computer program, apparatus, user interface, and system are also disclosed.

23 Claims, 3 Drawing Sheets

METHOD, COMPUTER-READABLE MEDIUM, APPARATUS, USER INTERFACE, AND SYSTEM FOR PROVISION OF A DICTIONARY

FIELD

The disclosed embodiments relate to a method, a computer-readable medium comprising a data structure, an apparatus, a user interface, and a system for provision of a dictionary associated to an application.

BACKGROUND

Computerized apparatuses, and in particular portable computerized apparatuses are becoming more and more sophisticated in terms of computing power. On the other hand, there is an increasing need to use this computing power in a user-friendly way. Especially with portable apparatuses, the user interface put constraints on input and output means. As more applications are made possible in these apparatuses, more user interaction is demanded. It is therefore a problem how to facilitate this user interaction.

SUMMARY

In view of the above, it would be advantageous to solve or at least reduce the problems discussed above. In particular, in one embodiment, an application specific dictionary is provided, which can facilitate user interaction when executing the particular application.

The disclosed embodiments are based on the understanding that different applications imply a different need in inputting information upon user interaction. For example, predictive text input is widely used for messaging, but when using the same predictive text input in other applications, the input mechanism used with great success in the messaging could be further improved. The disclosed embodiments are further based on the understanding that the size of a dictionary has impact on memory and processing requirements, where a smaller and adapted dictionary would perform better with regard to existing memory and processing capabilities. This invention has identified these issues, and is presenting an approach to provide a dictionary that is suitable for an application that is presently executed.

According to a first aspect of the disclosed embodiments, there is provided a method comprising determining an application to be executed; determining a dictionary associated to said determined application; and enabling said associated dictionary.

The enabling said associated dictionary may comprise determining if said associated dictionary is locally stored; if said associated dictionary is locally unavailable, downloading said associated dictionary; and invoking said associated dictionary for use with text input.

The downloading may comprise querying a user whether the associated dictionary is to be downloaded before downloading; and downloading the associated dictionary only if the user confirms downloading.

The downloading may comprise sending a request to a server for download of said associated dictionary; and receiving said associated dictionary from said server.

The enabling the associated dictionary may comprise determining if said associated dictionary is locally stored; if said associated dictionary is locally stored, checking a time stamp of said dictionary, determining age of said dictionary, and if said age exceeds a predetermined threshold, re-downloading said associated dictionary; and invoking said associated dictionary for use with text input.

The method may comprise deleting said associated dictionary when said application is no longer executed.

The method may comprise, when said application is no longer executing, disabling said associated dictionary; and storing said associated dictionary.

According to a second aspect of the disclosed embodiments, there is provided a computer-readable medium having stored thereon a data structure, comprising control instructions for causing an apparatus to execute an application; determine a dictionary associated to said executed application; and enable said associated dictionary.

The computer-readable medium may have further stored thereon a data structure, comprising control instructions for causing said apparatus to determine if said associated dictionary is locally stored; download said associated dictionary if said associated dictionary is locally unavailable; and invoke said associated dictionary for use with text input.

The computer-readable medium may have further stored thereon a data structure, comprising control instructions for causing said apparatus to query a user whether the associated dictionary is to be downloaded before downloading; and download the associated dictionary only if the user confirms downloading.

The computer-readable medium may have further stored thereon a data structure, comprising control instructions for causing said apparatus to send a request to a server for download of said associated dictionary; and receive said associated dictionary from said server.

The computer-readable medium may have further stored thereon a data structure, comprising control instructions for causing said apparatus to determine if said associated dictionary is locally stored; check a time stamp of said dictionary if said associated dictionary is locally stored; determine age of said locally stored dictionary; and re-download said associated dictionary if said age exceeds a predetermined threshold.

The computer-readable medium may have further stored thereon a data structure, comprising control instructions for causing said apparatus to delete said associated dictionary when said application is no longer executed.

The computer-readable medium may have further stored thereon a data structure, comprising control instructions for causing said apparatus to, when said application is no longer executing, disable said associated dictionary.

According to a third aspect of the disclosed embodiments, there is provided an apparatus comprising a memory storing a set of instructions, and a processor, executing the stored set of instructions, to perform a method comprising determining an application to be executed; determining a dictionary associated to said determined application; and enabling said associated dictionary.

The apparatus may further comprise a receiver enabling download of said associated if said associated dictionary is not present in said memory, and said processor is arranged to invoke said associated dictionary.

The apparatus may further comprise a transmitter arranged to send a request for download of said associated dictionary.

The memory may be storing said associated dictionary, and the dictionary may comprise a time stamp, and the processor may be further arranged to determine age of the stored associated dictionary, and if the age exceeds a predetermined threshold, to control re-download of the associated dictionary.

The said processor may be arranged to control said memory such that said associated dictionary is deleted when said application is no longer executed.

The said processor may be arranged to, when said application is no longer executing, disable said associated dictionary.

According to a fourth aspect of the disclosed embodiments, there is provided a system comprising an apparatus according to the third aspect of the invention, and a dictionary server arranged to provide the associated dictionary for downloading.

The system may comprise a communications network, wherein the dictionary server and the apparatus is in communication via the communications network.

According to a fifth aspect of the disclosed embodiments, there is provided a user interface comprising a text input, the user interface being arranged to determine an application being executed; determine a dictionary associated to said determined application; and enable said associated dictionary.

The dictionary may comprise a time stamp, and the user interface may be further arranged to determine age of said associated dictionary, and if said age exceeds a predetermined threshold, to control re-download of said associated dictionary.

The user interface may further be arranged to delete said associated dictionary when said application is no longer executed. Alternatively, the user interface may further be arranged to, when said application is no longer executing, disable said associated dictionary.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other aspects, features and advantages of the disclosed embodiments will appear from the following detailed disclosure, from the attached dependent claims as well as from the drawings.

BRIEF DESCRIPTION OF THE DRAWINGS

The above, as well as additional aspects, features and advantages of the disclosed embodiments, will be better understood through the following illustrative and non-limiting detailed description of preferred embodiments, with reference to the appended drawings, where the same reference numerals will be used for similar elements, wherein.

DETAILED DESCRIPTION OF PREFERRED EMBODIMENTS

Figure 1:
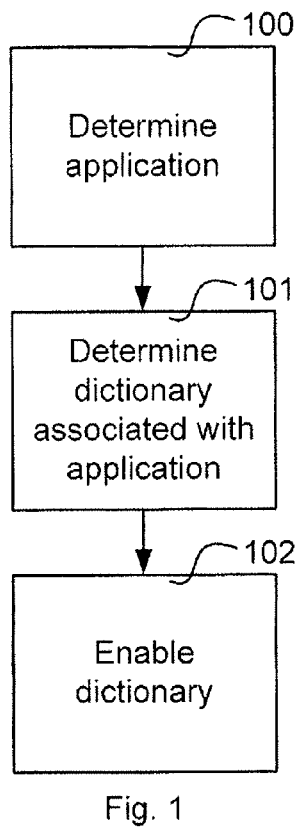
FIG. 1 is a flow chart illustrating a method according to one embodiment.

FIG. 1 is a flow chart illustrating a method according to an embodiment. In an application determination step 100, it is determined if and what application is executed. In a dictionary determination step 101, it is determined if and what dictionary that is associated with the executing application. In a dictionary enabling step 102, the determined associated dictionary to the executing application is enabled, i.e. the dictionary can be used, and the user can benefit of it for example for predictive text input when using the application.

Figure 2:
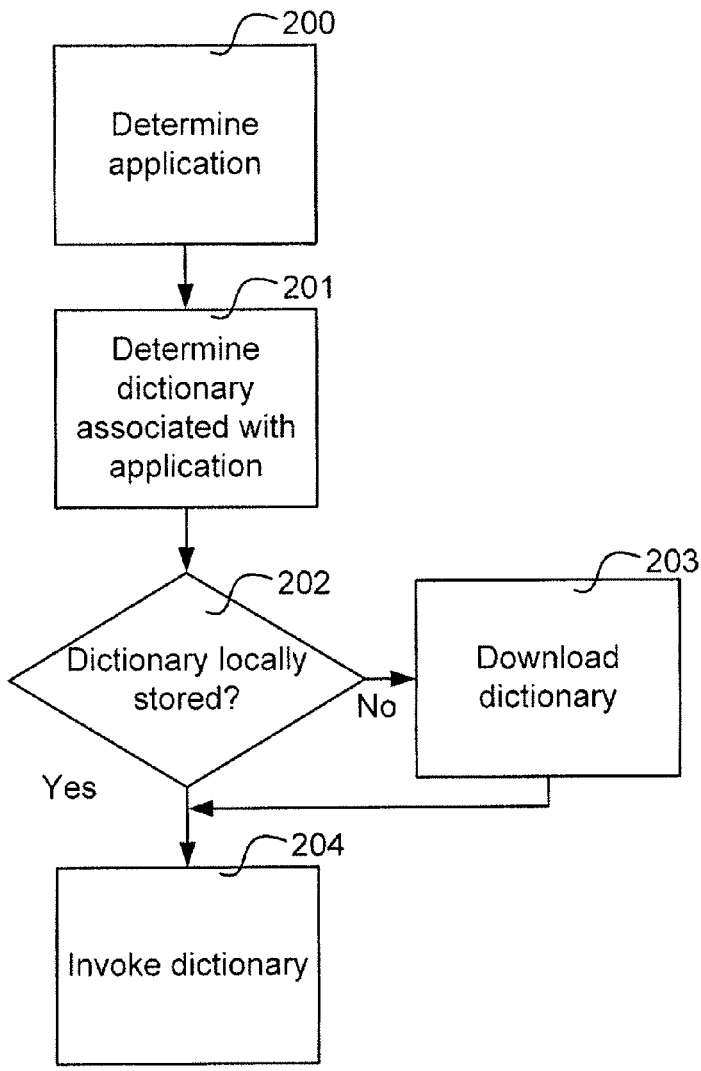
FIG. 2 is a flow chart illustrating a method according to an embodiment.

FIG. 2 is a flow chart illustrating a method according to an embodiment. In an application determination step 200, it is determined if and what application is executed. In a dictionary determination step 201, it is determined if and what dictionary that is associated with the executing application. In a dictionary checking step 202, it is checked if the determined dictionary is locally stored, i.e. present in the memory or memories of an apparatus on which the invention is performed. If the dictionary is locally unavailable, i.e. not present in any of the memories of the apparatus, the procedure goes on to a dictionary downloading step 203, wherein the associated dictionary is downloaded, for example from a dictionary server. In a dictionary invokation step 204, regardless of coming there from the dictionary checking step 202 or the dictionary downloading step 203, because in any case, there is an associated dictionary present. This associated dictionary is invoked by the application when a dictionary is needed.

Figure 3:
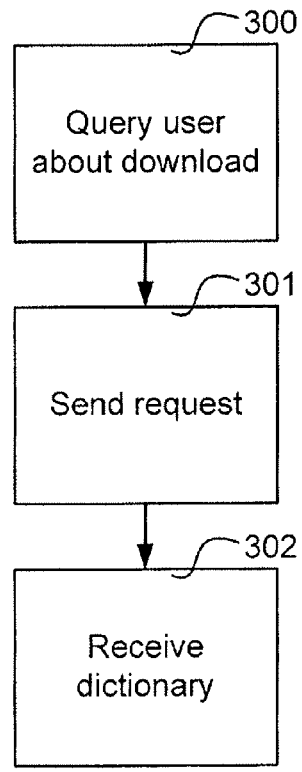
FIG. 3 is a flow chart illustrating downloading options that are applicable, sole or in combination, to any of the embodiments of FIGS. 1 and 2.

FIG. 3 is a flow chart illustrating options for downloading the associated dictionary in any of the embodiments demonstrated with reference to FIGS. 1 and 2. All of the options can be used together, as illustrated in FIG. 3, for the sake of facilitating understanding of the invention, but it should be emphasized that the options also can be used sole or in any combination. However, when used in full combination, the illustrated order of performing them is preferred, and will here be discussed.

In a query step 300, a user is queried whether the user agrees to download the dictionary. The reason for this can be various. For example, the user may not want to start any communication traffic at the moment, or there may be a cost for the user, i.e. the dictionary is to be purchased, or the user simply do not think that she is in use of the dictionary for her use of the application. On the other hand, if the user agrees on downloading the dictionary, the user may also agree on accepting an agreement on the use and distribution of the dictionary related to the right to the dictionary. There may also be a mechanism for purchasing the dictionary, if that is the case. Alternatively, it is only a simple confirmation to start downloading the dictionary.

In a request sending step 301, a request is sent to the provider of the dictionary that the dictionary is to be downloaded. The request is preferably sent to a dictionary server and via a communications network, as will be more thoroughly exemplified with reference to FIG. 5.

Figure 5:
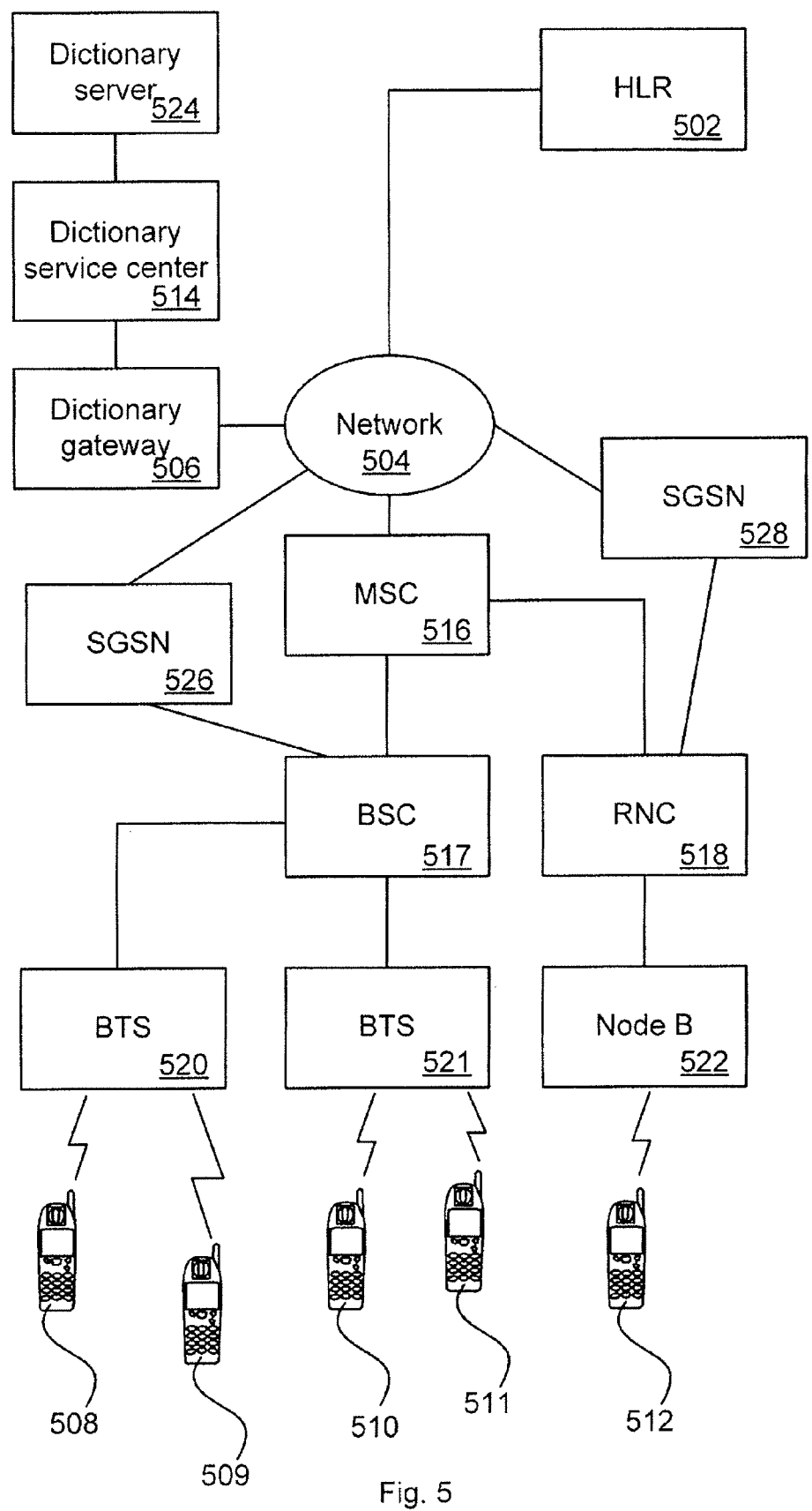
FIG. 5 schematically illustrates a system according to an embodiment.

In a dictionary reception step 302, the dictionary is received from a dictionary server, as also will be further exemplified with reference to FIG. 5. Upon reception, the dictionary is preferably stored in a local memory and initiated for use together with the application.

Figure 4:
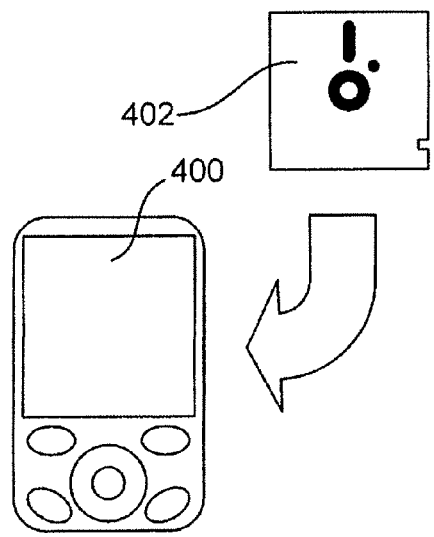
FIG. 4 schematically illustrates a computer readable medium and an apparatus in which a data structure of the computer readable medium can be utilized.

The invention can be computer-implemented, i.e. invention is performed on a general or dedicated computerized apparatus, such as a personal computer, a mobile phone, a digital camera, a personal digital assistant, a media player, or other similar apparatus. Instructions for performing the invention can then be executed by the apparatus. These instructions can be loaded into the apparatus 400 from a computer-readable medium 402, as exemplary illustrated in FIG. 4, having a data structure stored. The data structure comprises the control instructions which upon execution causes the apparatus to assertain that an associated dictionary to an executed application is enabled, including control instructions for determining the application, determining the associated dictionary, and enabling the determined associated dictionary. Control instructions for determining if the associated dictionary is locally stored, downloading the associated dictionary if the associated dictionary is locally unavailable, and invoking the associated dictionary are also present in the data structure. Thus, the user of the application is able to use the associated dictionary, for example for predictive text input, spell check, etc. Control instructions for acquireing the locally unavailable dictionary by the user being queried whether download is to be performed, wherein download is only performed upon confirmation by the user, can also present in the data structure.

The data structure is further arranged to control communication opon execution in said processor. The control instructions can for example make the processor control a receiver at download of the dictionary. Similarly, the control instructions can make the processor control a transmitter at sending of a request, for example to a server and via a communications network, for download of the associated dictionary.

The data structure can include control information on how to deal with the dictionary when the application to which it is associated is no longer executed. The control instructions can for example cause the processor to delete the dictionary to save memory space, or alternatively, disable the dictionary, but store is, for example in a secondary memory, for example a non-volatile memory, to be able to once again enable the dictionary, i.e. moving it to a primary memory, when the associated application executes next time. Here, the age of the dictionary can be checked, and if the age exceeds a certain threshold, the dictionary is updated by re-downloading it. To be able to determine the age of the dictionary, some kind of time stamp is needed. This can be a part of meta-data for the dictionary, which also can hold association information to the application, and optionally also specific to the user. A module of the data structure can be specially adapted for handling the acquireing of the locally unavailable dictionary by comprising instructions for safely downloading. This can comprise mechanisms for encryption, decryption, authentication, and verification. Based on this safe downloading mechanism, the data structure can comprise executable instructions for interaction with a user and an application/dictionary service provider to verify authorised downloading, comprising receiveing an offer to download the dictionary from the service provider, and confirming the offer upon verification from the user, whereby the dictionary is made downloadable by the service provider and optional payment for the dictionary is safely performed. As discussed above, the offer can comprise a plurality of alternatives, whereby the confirmation and verification from the user comprises a selection among the alternatives. The data structure is preferably in form of one or more computer programs.

A system architecture for managing a system 500 according to an embodiment is shown in FIG. 5. A Home Location Register (HLR) 502 contains a database (not shown) including relevant subscriber information for provision of telecommunication service. A CCITT specified network 504 interconnects the individual parts of the system 500. A dictionary gateway 506 is a switching unit routing a requested dictionary to a mobile communication apparatus 508-512. An Dictionary Service Center 514 (DSC) and the dictionary gateway 506 handles and routes the dictionaries between the DSC 514 and the network 504. From the network 504, the dictionaries are routed to the mobile communication apparatuses 508-512 via a Mobile Switching Center (MSC) 516 to a Base Station Controller (BSC) 517 and a Base Transceiver Station (BTS) 520, 521, or a Radio Network Controller (RNC) 518 and a Node B 522. Alternatively, the dictionaries are routed to the mobile communication apparatuses 508-512 via a Serving GPRS Support Node (SGSN) 526, 528 to the BSC 517 and the BTS 520, 521, or the RNC 518 and the Node B 522, respectively. The BTS 520, 521 or the Node B 522 establish the air connection to the mobile communication apparatuses 508-512.

According to an embodiment, a network operator or other third party company, for example the provider of the application, handling a dictionary server 524 could offer a dictionary service function where dictionaries associated with certain applications can be purchased. For example a network operator may have a dictionary server 524 supporting a feature where the user may send a dictionary request from his mobile communication apparatus 508-512 to the dictionary server 524 upon using a certain application of the mobile communication apparatus, e.g. a gaming or messaging application.

Figure 6:
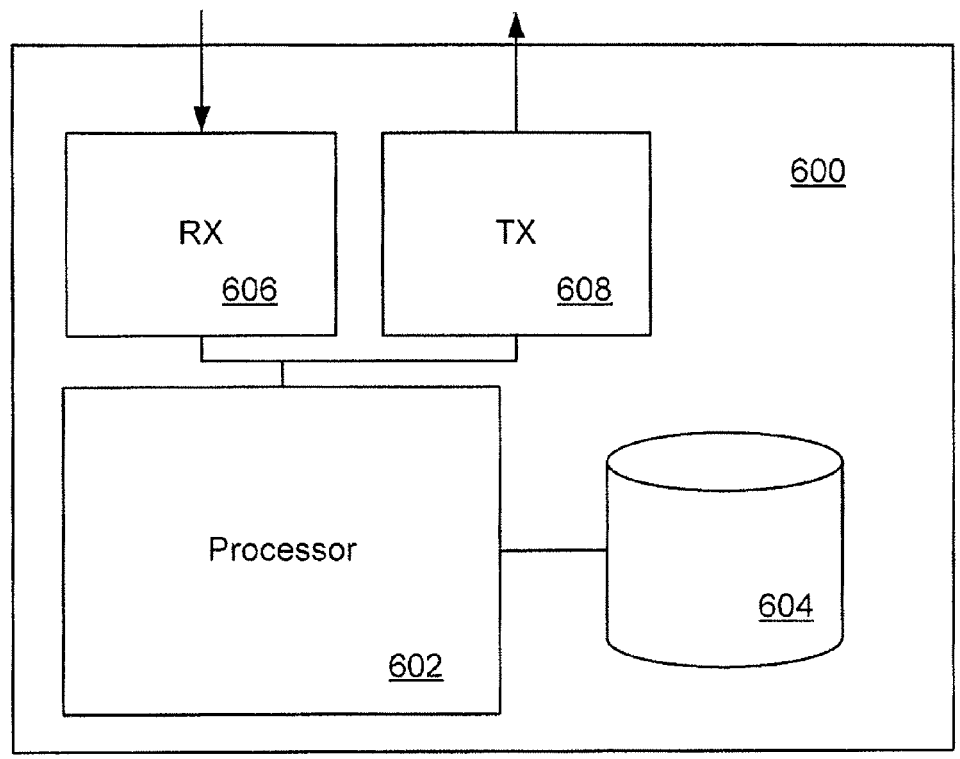
FIG. 6 schematically illustrates an apparatus according to an embodiment.

FIG. 6 schematically illustrates an apparatus 600 according to an embodiment. The apparatus 600 can be a general or dedicated computerized apparatus, such as a personal computer, a mobile phone, a digital camera, a personal digital assistant, a media player, or other similar apparatus. The apparatus comprises a processor 602 which is arranged to control elements and functions of the apparatus 600. To be able to perform this control, the processor 600 is provided with a set of instructions, which are stored in a memory 604, to be executed for the control of the apparatus 600. Upon execution, the processor causes the apparatus 600 to perform the methods of the various embodiments of the invention, as has been demonstrated with reference to FIGS. 1 to 3. The apparatus 600 can further comprise a receiver 606 for receiving a dictionary when it is being downloaded. The apparatus can comprise a transmitter 608 for transmitting a request, for example to a dictionary service provider and via a communications network, as has been exemplified with reference to FIG. 5, for downloading the desired dictionary.

The memory 604 can be arranged to store the dictionary. Here, it should be emphasized that in the schematic illustration of the apparatus 600 in FIG. 6, the memory 604 can in reality be a plurality of physical memories, which can be of different types, such as volatile or non-volatile memories, and/or arranged in different structures, such as secondary, primary and cache memories. For example, a downloaded dictionary, which has been used, but is no longer in use due to its associated application is no longer executing, can be stored in a non-volatile secondary memory to free space in other memories, and at the same time still be locally available.

Figure 7:
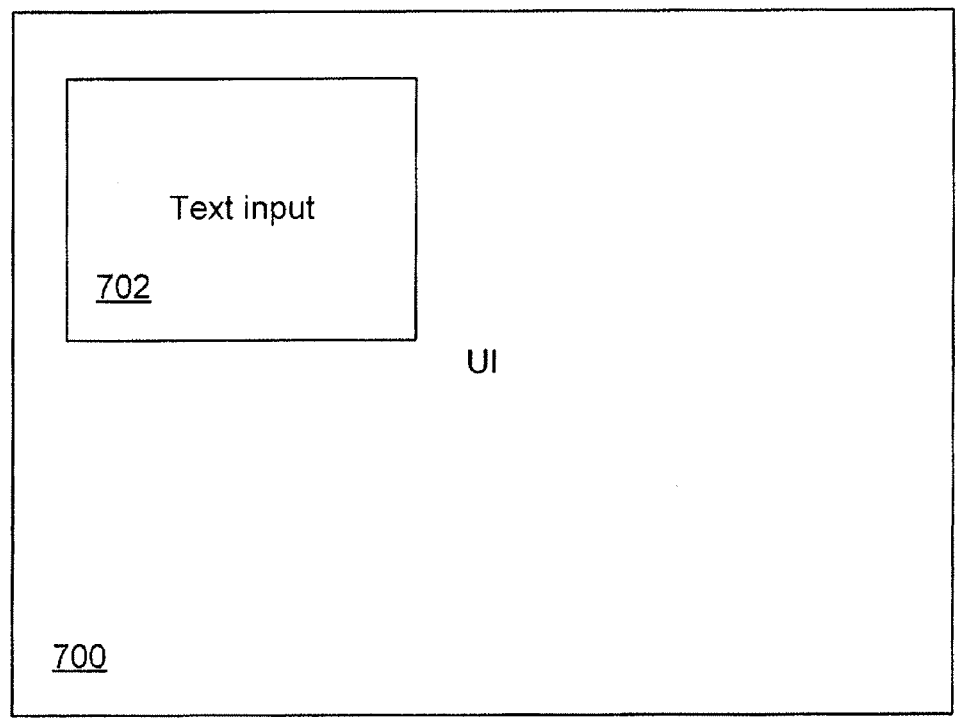
FIG. 7 schematically illustrates a user interface according to an embodiment.

FIG. 7 illustrates a user interface 700 comprising a text input 702. The user interface is arranged to determine an application that is executed, and to determine a dictionary associated with the determined application. From this determined information, an associated dictionary is enabled to support the text input 702 of the user interface 700. Similar features for handling the dictionary as those demonstrated with reference to FIGS. 1 to 6 are also applicable to the handling of the dictionary in the user interface 700.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method comprising:
using a processor to:
determine a user selected application to be executed;
determine a dictionary of possible text to be input by a user, said dictionary being associated to said determined application; and
enable said associated dictionary and thereby providing an application-specific dictionary.

2. The method according to claim 1, wherein enabling said associated dictionary comprises
determining if said associated dictionary is locally stored;
if said associated dictionary is locally unavailable, downloading said associated dictionary; and
invoking said associated dictionary for use with text input.

3. The method according to claim 2, wherein said downloading comprises
querying a user whether the associated dictionary is to be downloaded before downloading; and
downloading the associated dictionary only if the user confirms downloading.

4. The method according to claim 2, wherein said downloading comprises sending a request to a server for download of said associated dictionary; and
receiving said associated dictionary from said server.

5. The method according to claim 1, wherein enabling said associated dictionary comprises
determining if said associated dictionary is locally stored;
if said associated dictionary is locally stored, checking a time stamp of said dictionary,
determining age of said dictionary, and if said age exceeds a predetermined threshold, updating
said associated dictionary; and
invoking said associated dictionary for use with text input.

6. The method according to claim 1, comprising deleting said associated dictionary when said application is no longer executed.

7. The method according to claim 1, comprising, when said application is no longer executing,
disabling said associated dictionary; and
storing said associated dictionary.

8. A computer-readable medium having stored thereon a data structure, comprising control instructions for causing a portable device to
execute a user-selected application;
determine a dictionary of possible text to be input by a user, said dictionary being associated to said executed application; and
enable said associated dictionary and thereby provide an application-specific dictionary.

9. The computer-readable medium according to claim 8, having further stored thereon a data structure, comprising control instructions for causing said apparatus to
determine if said associated dictionary is locally stored;
download said associated dictionary if said associated dictionary is locally unavailable; and
invoke said associated dictionary for use with text input.

10. The computer-readable medium according to claim 8, having further stored thereon a data structure, comprising control instructions for causing said apparatus to
query a user whether the associated dictionary is to be downloaded before downloading; and
download the associated dictionary only if the user confirms downloading.

11. The computer-readable medium according to claim 8, having further stored thereon a data structure, comprising control instructions for causing said apparatus to
send a request to a server for download of said associated dictionary; and
receive said associated dictionary from said server.

12. The computer-readable medium according to claim 8, having further stored thereon a data structure, comprising control instructions for causing said apparatus to
determine if said associated dictionary is locally stored;
check a time stamp of said dictionary if said associated dictionary is locally stored;
determine age of said locally stored dictionary; and
re-download said associated dictionary if said age exceeds a predetermined threshold.

13. The computer-readable medium according to claim 8, having further stored thereon a data structure, comprising control instructions for causing said apparatus to delete said associated dictionary when said application is no longer executed.

14. The computer-readable medium according to claim 8, having further stored thereon a data structure, comprising control instructions for causing said apparatus to, when said application is no longer executing, disable said associated dictionary.

15. An apparatus comprising:
a memory storing a set of instructions, and
a processor configured for executing the stored set of instructions, the memory and the instructions configured to, with the processor, cause the apparatus to perform a method comprising:
determining, a user-selected application to be executed;
determining a dictionary of possible text to be input by a user, said dictionary being associated to said determined application; and
enabling said associated dictionary and thereby providing an application-specific dictionary.

16. The apparatus according to claim 15, further comprising a receiver enabling download of said associated if said associated dictionary is not present in said memory, and said apparatus is configured to invoke said associated dictionary.

17. The apparatus according to claim 16, further comprising a transmitter configured to send a request for download of said associated dictionary.

18. The apparatus according to claim 15, wherein said memory is storing said associated dictionary, and said dictionary comprises a time stamp, the apparatus is further configured to determine age of said stored associated dictionary, and if said age exceeds a predetermined threshold, to control re-download of said associated dictionary.

19. The apparatus according to claim 15, wherein said apparatus is configured to control said memory such that said associated dictionary is deleted when said application is no longer executed.

20. The apparatus according to claim 15, wherein said apparatus is configured to, when said application is no longer executing, disable said associated dictionary.

21. The apparatus of claim 15, wherein the apparatus comprises a personal computer, mobile phone, a digital camera, a personal digital assistant, or a media player.

22. A system comprising an apparatus and a dictionary server
wherein said apparatus comprises a memory storing a set of instructions, and a processor configured for executing the stored set of instructions, and configured to perform a method comprising:
determining an application to be executed;

determining a dictionary of possible text to be input by a user, said dictionary being associated to said determined application; and enabling said associated dictionary, wherein said dictionary server is configured to provide the associated dictionary for downloading.

23. The system according to claim 22, further comprising a communications network, wherein the dictionary server and the apparatus is in communication via the communications network.

* * * * *

UNITED STATES PATENT AND TRADEMARK OFFICE
CERTIFICATE OF CORRECTION

| | | |
|---|---|---|
| PATENT NO. | : 7,801,928 B2 | Page 1 of 1 |
| APPLICATION NO. | : 11/693108 | |
| DATED | : September 21, 2010 | |
| INVENTOR(S) | : John Rieman et al. | |

It is certified that error appears in the above-identified patent and that said Letters Patent is hereby corrected as shown below:

On the Title Page

Item (73) Assignee: Nokia Corporation, Espoo, delete "FL (US)" and insert --FI--

Signed and Sealed this

Ninth Day of November, 2010

David J. Kappos
*Director of the United States Patent and Trademark Office*